US010467026B2

(12) United States Patent
Stoodley

(10) Patent No.: US 10,467,026 B2
(45) Date of Patent: *Nov. 5, 2019

(54) CORRELATING CLASS LOADER OBJECTS ACROSS EXECUTION ENVIRONMENTS

(71) Applicant: International Business Machines Corporation, Armonk, NY (US)

(72) Inventor: Mark G. Stoodley, Markham (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/016,789

(22) Filed: Feb. 5, 2016

(65) Prior Publication Data

US 2016/0154658 A1 Jun. 2, 2016

Related U.S. Application Data

(63) Continuation of application No. 14/317,077, filed on Jun. 27, 2014, now Pat. No. 9,286,085.

(51) Int. Cl.
*G06F 9/445* (2018.01)
*G06F 8/41* (2018.01)

(52) U.S. Cl.
CPC ........ *G06F 9/44521* (2013.01); *G06F 8/4441* (2013.01); *G06F 9/44578* (2013.01)

(58) Field of Classification Search
CPC . G06F 9/44521; G06F 8/4441; G06F 9/44578
USPC ........................................................ 717/166
See application file for complete search history.

(56) References Cited

U.S. PATENT DOCUMENTS

| 6,430,569 | B1 * | 8/2002 | Bracha | G06F 9/445 |
| 6,442,558 | B1 * | 8/2002 | Brown | G06F 9/44578 |
| | | | | 707/812 |
| 6,446,084 | B1 * | 9/2002 | Shaylor | G06F 9/44521 |
| 6,470,494 | B1 * | 10/2002 | Chan | G06F 9/445 |
| | | | | 717/139 |
| 6,493,816 | B1 * | 12/2002 | Munroe | G06F 9/465 |
| | | | | 707/999.102 |

(Continued)

OTHER PUBLICATIONS

Sundaresan et al, "Experiences with Multi-threading and Dynamic Class Loading in a Java Just-In-Time Compiler", [Online], 2006, pp. 1-11, [Retrieved from internet on Jun. 16, 2019], <http: delivery. acm.org="" 10.1145="" 1130000="" 1122395="" 24990087.pdf?ip= "151.207.250.22&id=1122395&acc=ACTIVE%20SERVICE&key= C15">.*

(Continued)

*Primary Examiner* — Ziaul A Chowdhury
*Assistant Examiner* — Zengpu Wei
(74) *Attorney, Agent, or Firm* — David B. Woycechowsky

(57) ABSTRACT

Updating a native class pointer in persisted compiled code for use in an execution environment other than the one in which the native class pointer was created. This is done by using an identifier, stored with the persisted compiled code, of the class first loaded by the class loader that also loaded the class to which the native class pointer refers. A table is maintained in the execution environment mapping class identifiers to class loaders, and the stored identifier is used to consult this table to find a candidate class loader from those in the current execution environment that can provide the correct updated pointer.

12 Claims, 4 Drawing Sheets

(56) References Cited

U.S. PATENT DOCUMENTS

| | | | |
|---|---|---|---|
| 6,738,977 B1* | 5/2004 | Berry | G06F 9/44563 718/1 |
| 6,851,111 B2 | 2/2005 | McGuire et al. | |
| 7,870,546 B2 | 1/2011 | Meduri et al. | |
| 8,010,973 B2 | 8/2011 | Shetty | |
| 8,539,452 B2 | 9/2013 | Chapman et al. | |
| 2002/0049963 A1* | 4/2002 | Beck | G06F 9/4428 717/130 |
| 2005/0155028 A1* | 7/2005 | Park | G06F 8/41 717/166 |
| 2006/0190934 A1* | 8/2006 | Kielstra | G06F 9/45516 717/148 |
| 2007/0136719 A1* | 6/2007 | Lagergren | G06F 8/4441 717/140 |
| 2007/0245331 A1* | 10/2007 | Daynes | G06F 9/44521 717/166 |
| 2008/0184210 A1* | 7/2008 | Lee | G06F 8/4441 717/136 |
| 2009/0055821 A1* | 2/2009 | Grcevski | G06F 9/45516 718/1 |
| 2009/0125611 A1* | 5/2009 | Barsness | G06F 9/44563 709/220 |
| 2012/0304166 A1* | 11/2012 | Gu | G06F 9/4401 717/174 |
| 2013/0139134 A1 | 5/2013 | Burka et al. | |
| 2014/0059526 A1* | 2/2014 | Nguyen | G06F 9/44521 717/163 |
| 2014/0366034 A1* | 12/2014 | Fujisawa | G06F 9/5016 718/104 |
| 2015/0033215 A1* | 1/2015 | Elias | G06F 9/44521 717/166 |
| 2015/0046914 A1* | 2/2015 | Sahoo | G06F 8/00 717/166 |
| 2015/0256484 A1* | 9/2015 | Cameron | G06F 9/3004 709/226 |
| 2015/0378752 A1 | 12/2015 | Stoodley | |
| 2016/0170777 A1* | 6/2016 | Holt | G06F 9/44521 717/166 |

OTHER PUBLICATIONS

Shiv et al, "Impact of JIT/JVM Optimizations on Java Application Performance", [Online], 2003, pp. 1-9, [Retrieved from internet on Jun. 16, 2019], <https: ieeexplore.ieee.org="" stamp="" stamp.jsp?tp="&arnumber=1192351"> (Year: 2003)</https:>.*

Sreedhar et al, "A Framework for Interprocedural Optimization in the Presence of Dynamic Class Loading", [Online], 2000, pp. 1-12, [Retrieved from internet on Jun. 16, 2019], <http: citeseerx.ist.psu.edu="" viewdoc="" download?doi="10.1.1.27.8855&rep=rep1&type=pdf"> (Year: 2000)</http:>.*

Appendix P—List of IBM Patents or Patent Applications Treated as Related, 2 pages.

Bodden et al., "Taming Reflection: Aiding Static Analysis in the Presence of Reflection and Custom Class Loaders", 2011 33rd International Conference on Software Engineering (ICSE'11), May 21-28, 2011, Waikiki, Honolulu, HI, USA, pp. 241-250, Copyright 2011 ACM 978-1-4503-0445-0/11/05.

IBM, "IBM SDK, Java Technology Edition, Version 7 Release 1", GA Date Dec. 6, 2013, < http://www-01.ibm.com/support/docview.wss?uid=swg21657707>, Grace Period Disclosure Document.

Yamaguchi et al., "Design and Implementation of Serializing Method for Non-procedural Object Transfer between JavaVMs", 2011 IEEE Pacific Rim Conference on Communications, Computers and Signal Processing (PacRim), Aug. 23-26, 2011, pp. 262-267, 978-1-4577-0253-2/11, DOI: 10.1109/PACRIM.2011.6032903.

* cited by examiner

CORRELATING CLASS LOADER OBJECTS ACROSS EXECUTION ENVIRONMENTS

STATEMENT ON PRIOR DISCLOSURES BY AN INVENTOR

The following disclosure(s) are submitted under 35 U.S.C. 102(b)(1)(A) as prior disclosures by, or on behalf of, a sole inventor of the present application or a joint inventor of the present application:

(i) IBM, "IBM SDK, Java Technology Edition, Version 7 Release 1", GA Date Dec. 6, 2013, <http://www-01.ibm-.com/support/docview.wss?uid=swg21657707>.

BACKGROUND OF THE INVENTION

The present invention relates generally to the field of computer code compilation, and more particularly to compiler optimization.

Java is a well-known, class-based, object-oriented computer programming language. (Note: the term "JAVA" may be subject to trademark rights in various jurisdictions throughout the world and is used here only in reference to the products or services properly denominated by the mark to the extent that such trademark rights may exist.) In the stylized case, translating Java source code into machine-executable code is a two-stage process. In the first stage, Java source code from a .java file is compiled into byte-code—an intermediate, platform-independent representation of the code that can be run on any Java Virtual Machine (JVM)—that is then saved into a .class file. Then, at runtime, a JVM converts the bytecode in the .class file into native executable machine code on the target platform. This second conversion is often performed by a compiler as well, whether of the ahead-of-time (AOT) or just-in-time (JIT) varieties, which may use a number of optimization techniques to improve the code's runtime performance.

Two well-known optimization techniques are function inlining and profile-guided optimization (PGO). With function inlining—also known as inline expansion, or simply "inlining"—a call to a function is replaced by the body of the function itself. Inlining thereby avoids the overhead associated with making a function call, and, when used appropriately, can consequently improve the time and/or space performance of the code at runtime. Profile-guided optimization, as the name suggests, involves the evaluation of prior runtime behavior to guide selection of the most advantageous optimizations for the present compilation.

A class in object-oriented programming is an extensible template for creating objects, which are collections of values (data or data structures) and/or behaviors (member functions, or methods). A child class may be derived from one or more parent classes, in which case the child generally inherits the template of the parent and extends it through additional data fields and/or methods. If a parent contains a virtual function or method, a derived class may override that function by specifying behavior different from that of the parent when that function is invoked for an object of the derived class.

For the most part, classes in Java are loaded into a JVM at runtime by Java objects called class loaders. Caching loaded classes can save time in servicing subsequent requests for those classes, and in some implementations, cached classes may be shared among multiple JVMs through one or more shared class caches. Both class bytecode and native compiled code may be persisted through such caches.

The Java heap is memory available to a JVM for dynamic memory allocation. Allocated memory in the heap is freed through the process of garbage collection, whereby a set of roots is traversed for any reference to an object in memory, and if no reference is found, the memory allocated to that object is released. Other objects may be repositioned in the heap during this process as well.

A hash table, or hash map, is a commonly used data structure used to map keys to values. A hash table maps keys to values using a hash function, such that applying the hash function to a provided key produces an index into an array of values. Hash tables are popular because they are often more efficient than other table lookup functions, with well-designed hash tables being able to achieve a constant-order cost of operations independent of table size. However, hash functions cannot usually guarantee that every key will map to a unique index, so some form of collision detection and resolution must often be used as well. One example of this is separate chaining, where each index may be associated with a short list of key-value pairs: the hash function does the bulk of the searching (or sorting) work, while the few entries that remain are searched (or sorted) by some other method.

SUMMARY

According to an aspect of the present invention, there is a method, computer program product and/or system for use in a first program execution environment that performs the following steps (not necessarily in the following order): (i) creates a first map for looking up a class loader by a lookup identifier based, at least in part, on that class loader's first-loaded class; (ii) receives code compiled in a second program execution environment, which code includes: (a) a native class pointer to a target class loaded by a class loader in the second program execution environment, and (b) an associated lookup identifier based, at least in part, on a first-loaded class of the class loader in the second program execution environment; (iii) looks up in the first map, using the associated lookup identifier, a class loader in the first program execution environment; (iv) searches, via a referential identifier of the found class loader, for a current native class pointer to the target class; and (v) responsive to finding the current native class pointer, updates the native class pointer in the received code with the current native class pointer.

DETAILED DESCRIPTION

Figure 1:
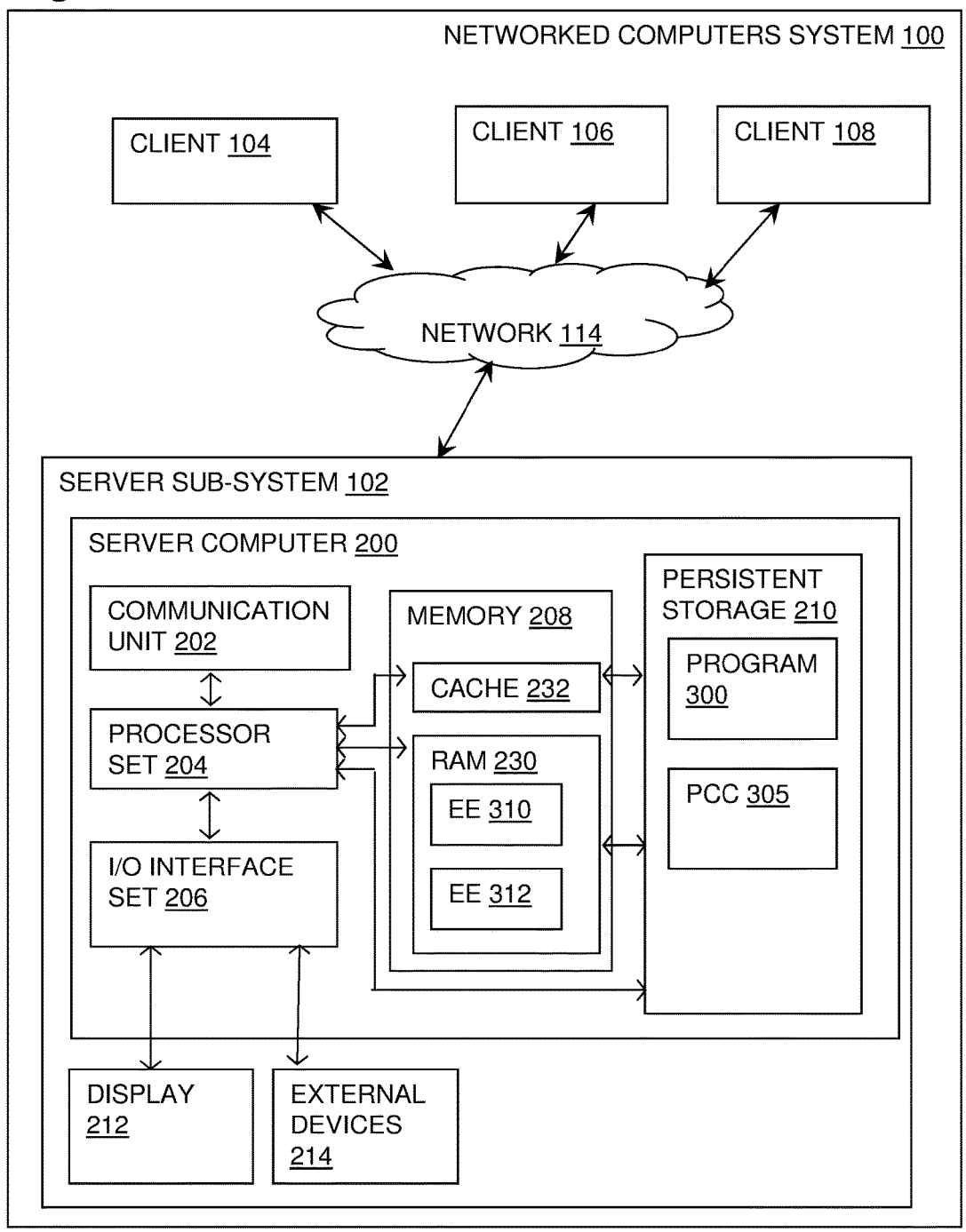
FIG. 1 is a block diagram view of a first embodiment of a system according to the present invention.

Some embodiments of the present invention update a native class pointer in persisted compiled code for use in an execution environment other than the one in which the native class pointer was created. This is done by using an identifier, stored with the persisted compiled code, of the class first loaded by the class loader that also loaded the class to which the native class pointer refers. A table is maintained in the execution environment mapping class identifiers to class loaders, and the stored identifier is used to consult this table to find a likely candidate class loader from those in the current execution environment that can provide the correct updated pointer. This heuristic is effective because these embodiments recognize that the set of classes loaded by a particular class loader object tends to correlate very strongly with the name of the first class loaded by that class loader.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, and 108; communication network 114; server computer 200; communication unit 202; processor set 204; input/output (I/O) interface set 206; memory device 208; persistent storage device 210; display device 212; external device set 214; random access memory (RAM) devices 230; cache memory device 232; execution environments 310 and 312; persisted compiled code 305; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. Example Embodiment

Figure 2:
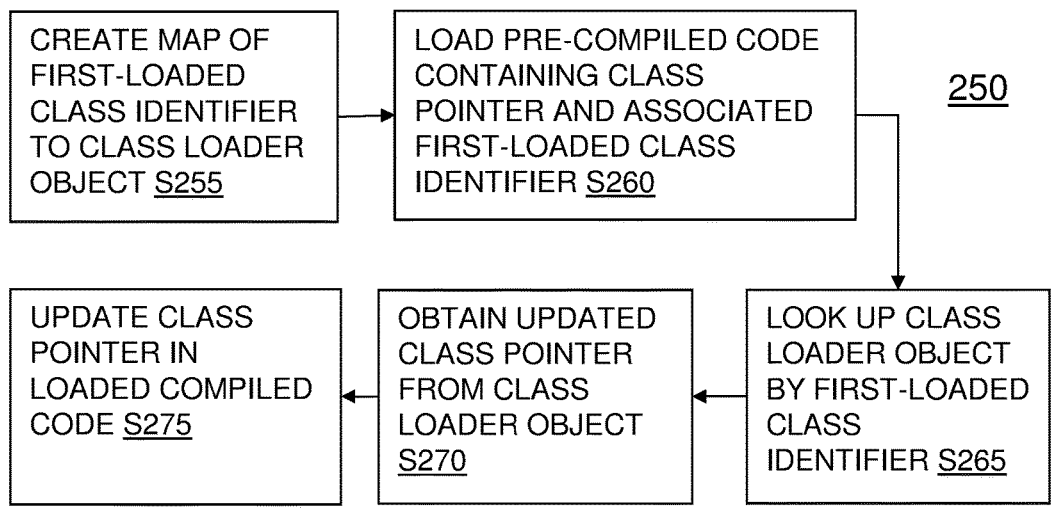
FIG. 2 is a flowchart showing a first embodiment method performed, at least in part, by the first embodiment system.
Figure 3:
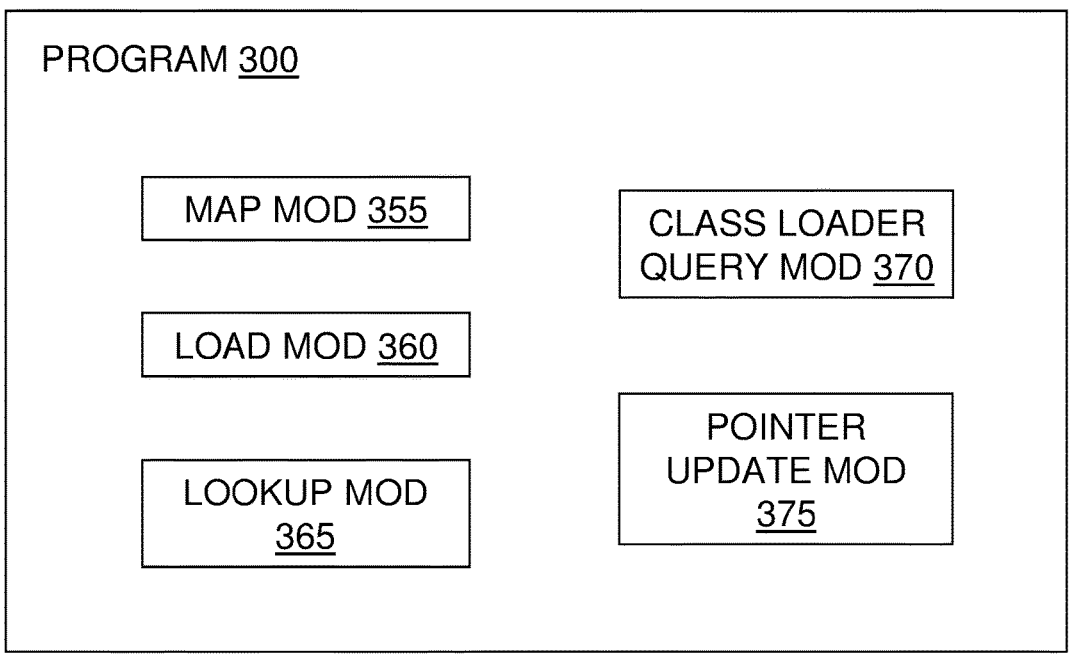
FIG. 3 is a block diagram view of a machine logic (for example, software) portion of the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks). References will also be made to FIGS. 1, 4A, and 4B as indicated.

As a preliminary step, program 300 is run in execution environment 310, creating persisted compiled code 305 (see FIG. 1). In this embodiment, program 300 is the code required to run a Java virtual machine (JVM) on server computer 200, while persisted compiled code 305 is native code compiled by the JVM from Java bytecode. While this disclosure makes extensive exemplary references to Java, the teachings disclosed herein may be applied in other, similar contexts to solve similar problems to those presented here. Moreover, those of skill in the art will recognize many alternatives to this example embodiment. For instance, persisted compiled code may be located in memory 208, persisted compiled code may be created by a program other than program 300, or execution environment 310 may be on client 104, to name a few examples.

Figure 4A:
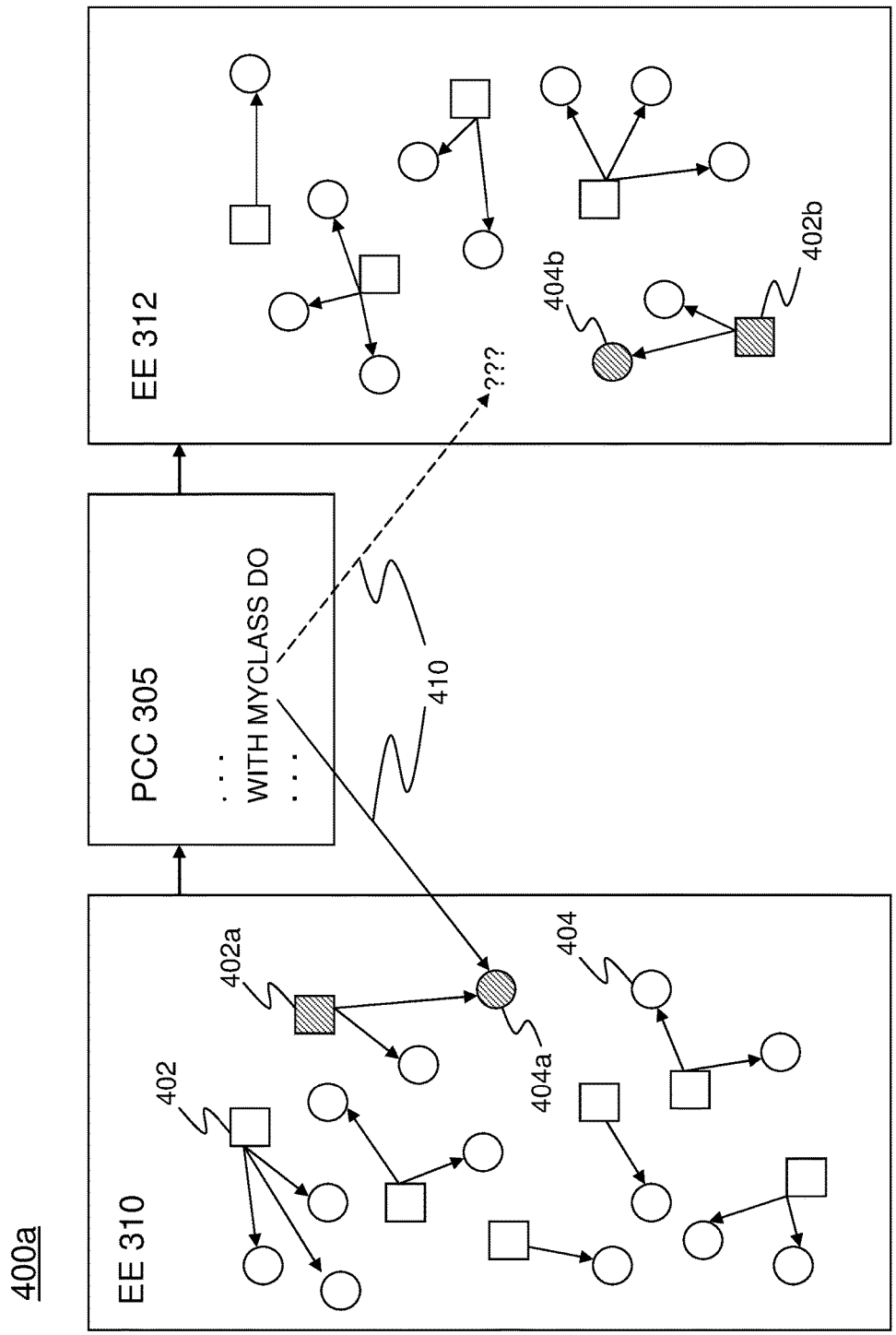
FIG. 4A is a first diagram view showing information that is generated by and/or helpful in understanding embodiments of the present invention.

Shown in FIG. 4A is diagram 400a, illustrating the basic scenario of interest. Diagram 400a includes execution environments 310 and 312; class loader objects 402 (squares), 402a, and 402b; class objects 404 (circles), 404a, and 404b; persisted compiled code 305; and "MyClass" pointer 410. Program 300 compiles and runs code 305 based on its context, execution environment 310. This context includes various class loaders 402 and classes 404 loaded by those class loaders, all found in various locations in execution environment 310. Code 305 contains native pointer 410, a reference to "MyClass" 404a, which was loaded by class loader 402a. Program 300 saves the code as persisted compiled code 305, which can be shared with other execution environments. However, in a different execution environment, such as execution environment 312, pointer 410 is no longer a reliable reference to "MyClass" (404b). Therefore, program 300 stores an additional piece of information (described in further detail below) with persisted compiled code 305 that will allow the reference to "MyClass" to be efficiently updated in a different execution environment.

Figure 4B:
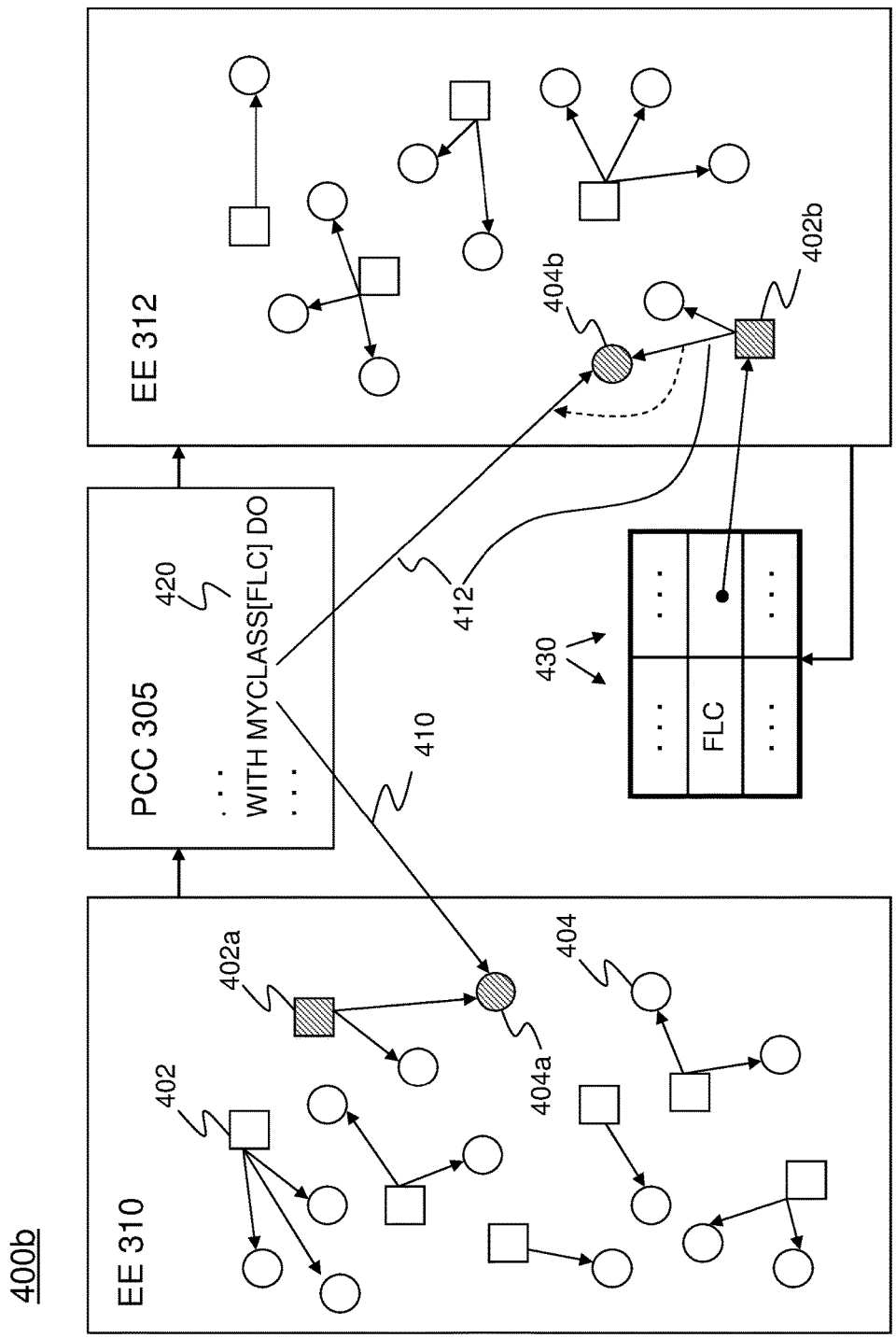
FIG. 4B is a second diagram view showing information that is generated by and/or helpful in understanding embodiments of the present invention.

Shown in FIG. 4B is diagram 400b, illustrating how the basic scenario presented in diagram 400a is addressed. Diagram 400b includes the same references as diagram 400a, plus first-loaded class reference 420; class-loader lookup table 430; and native pointer 412. These items will now be described in conjunction with the execution of program 300 in execution environment 312.

Processing begins at step S255, where, as program 300 begins using class loaders to load classes, map module ("mod") 355 begins creating map 430 of each first-loaded class to the class loader that loaded it. In this embodiment, each first-loaded class is identified in the map by name, but other forms of identification may be used, as discussed in the next subsection. Referring to execution environment 312 in FIG. 4B, class loader 402b first loads a class named "FLC," so map 430 includes an entry linking identifier "FLC" to class loader 402b.

Processing proceeds to step S260, where load mod 360 loads persisted compiled code 305, which includes pointer 410 to class "MyClass" from previous execution environment 310. Persisted compiled code 305 also includes class name 420, "FLC," which is associated with class pointer 410 and is the name of the first class loaded by the class loader that loaded "MyClass" in execution environment 310.

Processing proceeds to step S265, where lookup mod 365 looks up class name 420 in map 430, retrieving a reference to class loader 402b in turn. If "MyClass" has been loaded in execution environment 312, it was likely loaded by this class loader, so this class loader will be able to provide an updated pointer to "MyClass."

Processing proceeds to step S270, where class loader query mod 370 queries class loader 402b to see if it has indeed loaded class "MyClass," and if so query mod 370 asks class loader 402b for an updated pointer to "MyClass." Class loader 402b responds by supplying pointer 412.

Processing proceeds to step S275, where pointer update mod 375 updates the pointer to "MyClass" by replacing pointer 410 with pointer 412 in the loaded copy of persisted compiled code 305.

III. Further Comments and/or Embodiments

Some embodiments of the present invention recognize that many Java performance optimizations directly embed native pointers to particular classes in native compiled code, and that finding the correct pointer to use can sometimes be problematic. One example of this is with profile-based inlining, worth as much as 20% in benchmark throughput. For instance, consider a method M in a class C that uses a virtual invocation to call method D.FOO( ). In one JVM, profiling information may indicate that the most common target of FOO( ) is E.FOO( ), where class E extends class D. The JIT compiler therefore inserts the method E.FOO( ) directly in C.M( ), typically placing a guard around the inlined E.FOO( ) method to check if the receiver object is of class E. So if the original code were:

```
C.M(D o) {
    ...
    o.FOO( );
    ...
}
``` then, based on profile information that object o is most commonly of class E, the optimized code with inlining would be:

```
C.M(D o) {
    ...
    if (o.class == E)
        // inlined code for E.FOO( )
    else
        o.FOO( );
    ...
}
```

In this example, the compiler must embed a native pointer for class E into the compiled code. Getting that native class pointer is easy if the compiled code will only be used in the current JVM because the compiler already refers to classes directly by their native pointer address (or even if it doesn't have it in hand, it can run some code that determines the pointer in the current JVM process), but in scenarios where the code is cached into a persistent storage facility and is later loaded into a completely different JVM execution environment, it is not always so easy to get the correct native class pointer. For example, in Java the same class E can be loaded via multiple class loaders, in which case each loaded class E looks like a distinct class. In some cases, the pointer being sought is available via an entry in C's constant pool. For instance, if the inlined code in the above example had been from class D, then the native pointer for D would be available in C's constant pool because D is directly referenced in the original source code of C.M( ). However, the native class pointer actually needed here is for class E, but E is never mentioned by class C directly. Looking up the right E is therefore important for successful application of this optimization.

Note that "native pointer" in all these contexts means a distinct address in the current process address space. Native compiled code tends to use such addresses a lot, which tend to vary from process to process due to their process-specific nature. Java bytecode, on the other hand, refers to items via indices into what's called a "constant pool." To actually get at the item being referenced, a look up of the address is performed by "resolving" the constant pool entry needed. This extra level of indirection keeps the native pointer addresses hidden from the bytecode, but it's much slower to run the code. Sometimes native code also uses these constant pool indices to refer to entries that have not yet been resolved (so there is no native address for it yet). These cases are not a problem for persisted code because the indices don't change from JVM process to JVM process.

Some embodiments of the present invention further recognize that classes in Java are loaded by Java objects called class loaders. To look up class E, a request is made to some particular class loader object to find a class named "E." While there are some specific, pre-defined class loader objects (such as the system class loader, the extensions class loader, and the default application class loader), the Java language offers complete freedom to create new class loader objects with an arbitrary hierarchy of delegation. A middleware application server consisting of tens of thousands of active classes may be using hundreds of class loaders to load classes subdivided into components. If C.M( ) needs to look up a native pointer for class E, it would be helpful to know which of those hundreds of class loaders it should use. Without this information, guessing which loader to use is more likely to result in failure to find the necessary pointer, especially in complicated applications like the middleware application server example here, and the alternative of simply not using the optimization based on E because there is no way to know how to make sure it will work in another JVM process is not desirable either.

Some embodiments of the present invention recognize that, abstractly speaking, the class loader that should be used is the same class loader that was used for the lookup when the code was initially compiled. However, they also recognize that class loaders are just Java objects that exist on the heap, and that when code is compiled in a first JVM execution and loaded in a second JVM execution, there is currently no way to correlate the Java class loader objects that were created in those two different JVM executions. Indeed, the first JVM may have stopped and its heap memory released back to the operating system by the time the second JVM begins executing, so the Java class loader objects in the two JVM executions do not necessarily even exist at the same time. Without a way to tie the class loaders in the current JVM back to the class loaders that were used in an earlier JVM, it may not be possible to identify a native pointer to use for the E class when persisted compiled code is loaded. This means persisted code may not perform as well as non-persisted compiled code for Java, because the compiler will effectively only use constant pool indices, not native pointers, making the compiled code run much slower.

Some embodiments of the present invention recognize that object serialization may be able to recreate the precise state of an object in one JVM that existed in another JVM, but that object serialization does not recreate object identity. Perhaps a class loader object could be serialized in one JVM and then deserialized into another JVM, but these class loader objects would not necessarily have the same identity (that is, the same functional properties) in those two JVMs.

Some embodiments of the present invention recognize that applications and component management frameworks (such as the Open Service Gateway initiative, or OSGi) could be modified to create a consistent identifier for class loader objects. These identifiers could then be communicated to the Java Virtual Machine in some JVM-vendor-neutral way so that no vendor has to do anything to make it work (or all JVM vendors would need to implement support for them) and each application/framework would need to find ways to manage versioning of class loader objects so that changes to the set of class loaders cannot cause a JVM to have a stale notion of the set of class loader objects and their relationship to class loaders used in earlier versions of the application/framework. While possibly feasible, this approach would require Java application code to change and to manage its own changes in order to properly benefit from low level optimizations like profile-based inlining in persisted code.

Some embodiments of the present invention recognize that brute force methods, such as trying every class loader, could also be used, but that they are unlikely to perform well in scenarios with large numbers of class loaders.

At the same time, some embodiments of the present invention recognize: (i) that the set of classes loaded by a particular class loader object tends to correlate very strongly with the name of the first class loaded by that class loader, even across multiple JVM executions if the same application is being run; and/or (ii) every JVM can easily build a "class loader" hash table or other data structure that maps first-loaded class names to class loader objects, or that otherwise associates first-loaded class with a class loader, in the current JVM. While it is possible for two classes to have the same fully resolved class name, this unusual case can: (i) be made even more uncommon through the use of class chains rather than just class names; and (ii) be detected to prevent problems due to collisions. These techniques are covered in greater detail below.

For the example introduced earlier in this subsection, the observed relationship between the first-loaded class and the set of loaded classes of a particular class loader object means that, when C.M( ) is compiled, the name of the class first loaded by E's class loader (say, for example, a class called "FireTruck") can be recorded. When the persisted compiled code for C.M( ) is later loaded in another JVM instance, that code will need to be bound (or relocated) into that JVM. As mentioned in above, part of that process is to update the "E" native class pointer. To look up the right "E" class in this JVM, the class loader hash table is used to map "FireTruck," recorded with the compiled code, to a class loader (call it "CL") in the current JVM. If FireTruck→CL exists in the class loader hash table, then CL can be queried to see if it has loaded a class called "E." If it has, the embedded pointer to the E class can be updated in the compiled code accordingly. Now, when that code executes, objects with a receiver class matching that native pointer E will correctly execute the inlined code. Additional checks are needed to ensure that the inlined code can be correctly executed even by objects of this E class, but the concern here is only with updating the native code pointer in the guard in cases where the inlined code is valid—validity is presumed to be determined by other means.

In some embodiments of the present invention, a JVM maintains two hash tables: (i) a hash to map class identifiers to class loaders; and (ii) a hash to map class loaders to class identifiers. Note that "class identifier" is used here as a generic term for some value that identifies a particular class. Some possible class identifiers are described below. Both hash tables store basically the same information, with the first hash table, indexed by function hash1, being the inverse of the second hash table, indexed by function hash2, so that for a class C loaded by a class loader CL, hash2 (hash1(C))==C and hash1(hash2(CL))==CL. These two hash tables do not need to persist beyond the lifetime of the current JVM: they can be built by the JVM as class loaders are created and as classes are loaded and can be thrown away when the JVM shuts down.

In some embodiments of the present invention, entries are created in the two hash tables on class load events (that is, when a class loader actually loads its first class without delegating to another class loader). For instance:

```
firstLoadedClass = hash2(C->classLoader);
if (firstLoadedClass == NULL) {
    firstLoadedClass = C;
    CL = hash1(C);
    if (CL == NULL) {
        map C to C->classLoader in hash1
        map CL to C in hash2
    }
    else {
        // COLLISION: classes that could be loaded from both
           CL or C->classLoader cannot be distinguished
        // different policies are possible here, including
           removing the existing hash1(C) mapping
    }
}
```

In some embodiments of the present invention, entries are removed from the hash tables on class loader unload events (before that class loader's classes are actually unloaded):

```
for (classes C in classLoader being unloaded) {
    remove hash1(C)
}
remove hash2(classLoader)
```

Whenever the JVM wants to perform a profile-based optimization that requires a particular class "profiledClass" to be identified in the code, it needs to record hash2 (profiledClass→classLoader) (that is, the identifier of the class first loaded by classLoader) along with the location of the embedded profiledClass pointer (in the compiled code) so that another JVM can figure out how to look up a suitable profiledClass. Making sure that information is only used in correct ways is still the responsibility of the consuming optimization, which must also take into account whatever collision handling policy is implemented. It is possible for a different class to be returned by this lookup, but most often the expected class will be returned.

Some embodiments of the present invention identify an isolated class as follows: (i) by name; (ii) by class file location; (iii) by class file contents, and/or (iv) by a persistent pointer (or offset) to the class contents or internal format in a persistent storage facility. Once a way to identify an isolated class is selected, there are also options regarding what kind of identifier to create to completely describe a particular class. Accordingly, some embodiments of the present invention create a class identifier that: (a) just identifies the isolated class (for example, C); (b) identifies the class and its superclasses (C extends B extends A extends Object, a "basic class chain"); (c) identifies the class and its superclasses and its implemented interface(s) (C extends B extends A extends Object, and C implements I_1, I_2, and I_3, an "enhanced class chain"). All combinations of the above are possible. For instance, (i)(a) might use "C" as a class identifier, whereas (iv)(c) might use array of pointers [offset(C), offset(B), offset(A), offset(Object), offset(I_1), offset(I_2), offset(I_3)], or a pointer to that array, as a class identifier.

Different identifier choices have different trade-offs between the kinds of optimizations that will be safe and the likelihood that an exact match will not be possible. For example, using option (c) may reduce the chance of a collision by storing more potentially unique information (the more information stored about a class, the better chance it can be thereby uniquely identified; as the amount of information is reduced, the chance more than one class will match the information stored increases), but it requires the largest number of classes to be stored in the persistent storage facility in order to create a proper identifier. If not all classes can be stored into a persistent storage facility (due for example, to size constraints), the risk that an identifier cannot be created in a given case is increased. If an identifier cannot be created, then there will be no way to describe how to discover the necessary pointer in another JVM, which may mean fewer optimization opportunities.

If a collision is detected when looking up hash1(C) in the algorithm above, that means that more than one class loader loaded the class "C" as its first class. From this point forward, it will no longer be possible to distinguish which class loader should be used to load classes. For example, if both CL1 and CL2 both load a class called "FireTruck" as their first class, then proceed to load other classes, the algorithm as described above has no mechanism to determine whether to use CL1 or CL2 to look up class pointers for classes registered against a class loader identified by "FireTruck." One JVM may create the equivalent of CL1 while another JVM may create the equivalent of CL2. If a profiled class pointer for a class C loaded by CL1 is embedded into the native code for a method, the second JVM may load a completely different class because it is using CL2 instead of CL1.

In many optimizations, the difference will not introduce functional problems so long as the shape of the class looked up matches that of the class originally used. For example, in the method inlining case, so long as the receiver class has the same shape as the receiver class assumed by the inlined code, the guard is still correct. It may be the case that objects of that receiver class won't actually be flowing through that invocation site, and so the guard will always fail, but that's a performance problem, not a correctness issue.

In other cases, even if the shape is correct there could still be functional problems. An example here would be accelerating an instanceof test by comparing it directly to a particular class pointer. In this case, even if the class shape is correct, the fact that the class is loaded by the wrong class loader may break the instanceof relationship and result in a different (probably incorrect) code path executing. In cases like this one, however, the relationship can be re-tested before actually storing the new class pointer into the code, so corrective action can be taken if the class does not have the right quality.

There is typically a way to react to a collision in a way that does not affect program correctness. When they happen, however, collisions will usually reduce the effectiveness of the performance optimizations being applied, so will likewise reduce performance. Reducing the frequency of collisions therefore increases the likelihood that the benefits of the optimizations can be realized in different JVMs, which means the performance of code loaded from a persistent store will be closer to the performance of code compiled for only the JVM that is current running (where the relevant class information is precisely known, collision or not).

The frequency of collisions can be reduced by adding secondary tests when a collision is detected to distinguish the different class loaders. For example, the second or third loaded classes could be added to the hashing mechanism if colliding class loaders tend to diverge quickly in the set of classes they load. The mechanism could be extended to as many classes as needed, but being too careful may result in false mismatches as class loading tends to be somewhat nondeterministic, with the precise order of classes loaded by a particular class loader possibly changing somewhat from run to run. Including too many classes may then result in a class loader not looking the same as it should just because it loaded C2 then C1 instead of C1 then C2. This effect is more prevalent the further into the list of loaded classes one goes.

Other features of the class loaders could also be incorporated into the hash (not just the first loaded class) to reduce the frequency of collisions. For example, if the order of class loader creation is consistent in different JVMs, per-class-loader counters bumped on each collision in hash1 could be used to distinguish class loaders that collide on first loaded class. The shape of the first class could also be used to distinguish it from other classes (that is, instead of just using a class's name, the names of all its superclasses and the interfaces it implements are also included).

It may not be advisable to apply the teachings disclosed herein for performance optimizations where it cannot be made safe to recover when a class loader collision occurs or is detected. This is because the collision will likely be detected long after performance opportunities have already been exploited. If code has been loaded by other JVMs, a functional mistake may have already occurred by the time the collision is detected (either in that JVM or even in another JVM).

In some embodiments of the present invention, native data structures associated with each class and class loader are used rather than the Java class and class loader objects. For some such embodiments, native pointers are used because native data structures tend to not move around much. If Java class or class loader objects are used, the garbage collector (GC) needs to know about the existence of any hash tables or other data structures used for mapping first loaded classes to class loaders and vice versa, and that such tables should be walked as part of the root set for the Java heap. Since classes are tied to their class loader and entries are removed from the tables when a class loader is unloaded, there is no danger of unloaded object pointers appearing in the table or the GC "missing" an object pointer, but if the GC decides to move one of these objects then the tables must be updated with the new location of each moved object. It should be remembered that class loader object references are weak references that should not keep the class loader alive, and, additionally, if the tables can be accessed while the GC is running, appropriate synchronization will be needed (such as locks or write barriers) to make sure the tables are always correct and that the GC can correctly model the contents of the tables.

Some embodiments of the present invention may include one, or more, of the following features, characteristics, and/or advantages: (i) consider class loaders across multiple JVM instances; (ii) care about the identity of class loaders; (iii) include a mechanism that identifies class loaders in different JVM instances; (iv) attempt to correlate objects among different JVMs that are potentially running the same code; (v) identify class loader objects among different JVM instances; (vi) identify class loaders across different JVM instances for general Java applications; (vii) identify class loaders; and/or (viii) introduce zero or nominal overhead with commonly employed class loader structures.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Execution environment, program execution environment: a single executing instance of a runtime environment; examples include an operating system "process" or an instance of a Java virtual machine.

What is claimed is:

1. A method comprising:
setting up a first execution environment including a first virtual machine and a first instance of a first class loader located at a first location in the first execution environment;
creating a first native class pointer, for use in the first execution environment by the first virtual machine, with the first native class pointer pointing to the location of a first instance of a first class loader in the first execution environment;
compiling, by the first virtual machine, a compiled code portion with the compiled code portion including the first native class pointer;
creating a first class loader identifier for the first class loader;
storing a mapping of the first class loader identifier to the first class loader;
storing persisted data including the compiled code portion along with the first loader class identifier;
setting up a second execution environment including a second virtual machine and a second instance of a first class loader located at a second location in the second execution environment;
accessing, by the second virtual machine running in the second execution environment, the persisted data including the first class loader identifier;
identifying, by the second virtual machine running in the second execution environment, the first class loader using the mapping between the first class loader identifier and the first class loader; and
finding, by the second virtual machine running in the second execution environment, the second location of second instance of the first class loader in the second execution environment;
wherein the first class loader identifier includes: (i) a name associated with the first class loaded by the first class loader, and (ii) a name of a set of superclass(es) of the first class loaded by the first class loader;
wherein the first virtual machine is distinct from the second virtual machine and any additional consecutive virtual machines.

2. The method of claim 1 further comprising:
replacing an instance of the first native class pointer in the persisted data with the first class loader identifier.

3. The method of claim 1 further comprising:
prior to setting up the second execution environment, terminating the first execution environment and the first virtual machine.

4. The method of claim 1 further comprising:
using, by the second virtual machine running in the second execution environment, the second instance of the first class loader to load a class.

5. A computer program product comprising:
comprising:
a machine readable storage device; and
computer code stored on the machine readable storage device, with the computer code including instructions for causing a processor(s) set to perform operations including the following:
setting up a first execution environment including a first virtual machine and a first instance of a first class loader located at a first location in the first execution environment,
creating a first native class pointer, for use in the first execution environment by the first virtual machine, with the first native class pointer pointing to the location of a first instance of a first class loader in the first execution environment,
compiling, by the first virtual machine, a compiled code portion with the compiled code portion including the first native class pointer,
creating a first class loader identifier for the first class loader,
storing a mapping of the first class loader identifier to the first class loader,
storing persisted data including the compiled code portion along with the first loader class identifier,
setting up a second execution environment including a second virtual machine and a second instance of a first class loader located at a second location in the second execution environment,
accessing, by the second virtual machine running in the second execution environment, the persisted data including the first class loader identifier,
identifying, by the second virtual machine running in the second execution environment, the first class loader using the mapping between the first class loader identifier and the first class loader, and
finding, by the second virtual machine running in the second execution environment, the second location of second instance of the first class loader in the second execution environment;
wherein the first class loader identifier includes: (i) a name associated with the first class loaded by the first class loader, and (ii) a name of a set of superclass(es) of the first class loaded by the first class loader;
wherein the first virtual machine is distinct from the second virtual machine and any additional consecutive virtual machines.

6. The CPP of claim 5 wherein the computer code further includes instructions for causing the processor(s) set to perform the following operation:
replacing an instance of the first native class pointer in the persisted data with the first class loader identifier.

7. The CPP of claim 5 wherein the computer code further includes instructions for causing the processor(s) set to perform the following operation:
prior to setting up the second execution environment, terminating the first execution environment and the first virtual machine.

8. The CPP of claim 5 wherein the computer code further includes instructions for causing the processor(s) set to perform the following operation:
using, by the second virtual machine running in the second execution environment, the second instance of the first class loader to load a class.

9. A computer system (CS) for use in a first program execution environment, the CS comprising:
a processor(s) set;
a machine readable storage device; and
computer code stored on the machine readable storage device, with the computer code including instructions for causing the processor(s) set to perform operations including the following:
setting up a first execution environment including a first virtual machine and a first instance of a first class loader located at a first location in the first execution environment,
creating a first native class pointer, for use in the first execution environment by the first virtual machine, with the first native class pointer pointing to the location of a first instance of a first class loader in the first execution environment, compiling, by the first virtual machine, a compiled code portion with the compiled code portion including the first native class pointer, creating a first class loader identifier for the first class loader, storing a mapping of the first class loader identifier to the first class loader, storing persisted data including the compiled code portion along with the first loader class identifier, setting up a second execution environment including a second virtual machine and a second instance of a first class loader located at a second location in the second execution environment, accessing, by the second virtual machine running in the second execution environment, the persisted data including the first class loader identifier, identifying, by the second virtual machine running in the second execution environment, the first class loader using the mapping between the first class loader identifier and the first class loader, and finding, by the second virtual machine running in the second execution environment, the second location of second instance of the first class loader in the second execution environment;

wherein the first class loader identifier includes: (i) a name associated with the first class loaded by the first class loader, and (ii) a name of a set of superclass(es) of the first class loaded by the first class loader; and wherein the first virtual machine is distinct from the second virtual machine and any additional consecutive virtual machines.

10. The CS of claim 9 wherein the computer code further includes instructions for causing the processor(s) set to perform the following operation:

replacing an instance of the first native class pointer in the persisted data with the first class loader identifier.

11. The CS of claim 9 wherein the computer code further includes instructions for causing the processor(s) set to perform the following operation:

prior to setting up the second execution environment, terminating the first execution environment and the first virtual machine.

12. The CS of claim 9 wherein the computer code further includes instructions for causing the processor(s) set to perform the following operation:

using, by the second virtual machine running in the second execution environment, the second instance of the first class loader to load a class.

* * * * *